US006853511B2

(12) United States Patent
Seng et al.

(10) Patent No.: US 6,853,511 B2
(45) Date of Patent: Feb. 8, 2005

(54) AVERAGE POSITION ERROR MEASUREMENT IN A DATA STORAGE DEVICE

(75) Inventors: Edmund ChianSong Seng, Singapore (SG); Xiong Liu, Singapore (SG); AikChuan Lim, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 403 days.

(21) Appl. No.: 10/183,712

(22) Filed: Jun. 25, 2002

(65) Prior Publication Data

US 2003/0174431 A1 Sep. 18, 2003

Related U.S. Application Data

(60) Provisional application No. 60/363,763, filed on Mar. 12, 2002.

(51) Int. Cl.$^7$ .............................................. G11B 5/596
(52) U.S. Cl. ................... 360/77.02; 360/77.06; 360/77.08
(58) Field of Search ................ 360/77.02, 31, 360/39, 46, 53, 69, 75, 77.04, 77.06, 77.08

(56) References Cited

U.S. PATENT DOCUMENTS

| | | | | |
|---|---|---|---|---|
| 4,939,599 A | | 7/1990 | Chainer et al. .......... 360/77.04 |
| 5,233,487 A | * | 8/1993 | Christensen et al. ..... 360/77.04 |
| 5,408,367 A | * | 4/1995 | Emo ....................... 360/77.02 |
| 5,570,244 A | * | 10/1996 | Wiselogel ................ 360/77.02 |
| 5,600,500 A | * | 2/1997 | Madsen et al. ............... 360/46 |
| 5,940,250 A | * | 8/1999 | McNeil et al. ........... 360/246.6 |
| 6,061,201 A | * | 5/2000 | Woods .................... 360/77.06 |
| 6,181,493 B1 | | 1/2001 | Wakefield .................... 360/31 |
| 6,327,112 B1 | * | 12/2001 | Ide et al. ................. 360/77.08 |
| 6,359,749 B1 | | 3/2002 | Fukushima ................. 360/121 |
| 6,476,989 B1 | * | 11/2002 | Chainer et al. .......... 360/77.08 |
| 6,650,491 B2 | * | 11/2003 | Suzuki et al. ............ 360/77.02 |

OTHER PUBLICATIONS

"Minimizing Effects of Vibration at Servowrite," Sep. 1, 1988, IBM TDB, vol. 31, No. 4, TDB–ACC–NO: NN8809129, all pages.*

* cited by examiner

*Primary Examiner*—Sinh Tran
*Assistant Examiner*—James L Habermehl
(74) *Attorney, Agent, or Firm*—David K. Lucente; Derek J. Berger

(57) ABSTRACT

A number of data pairs, each data pair comprises a write-to-read track misregistration (WRTMR) value and an average position error margin (APE) value, are determined for a data storage device. Each of the data pairs is associated with a unique predetermined non-repeatable runout (NRRO) error in the data storage device. Each of the predetermined NRRO errors is caused by subjecting the data storage device to a unique NRRO error stimulus. An ideal APE margin is then determined for the data storage device by using the data pairs to extrapolate an APE margin corresponding to a WRTMR value of zero.

27 Claims, 4 Drawing Sheets

AVERAGE POSITION ERROR MEASUREMENT IN A DATA STORAGE DEVICE

RELATED APPLICATIONS

This application claims priority of U.S. provisional application Serial No. 60/363,763 filed Mar. 12, 2002.

FIELD OF THE INVENTION

This application relates generally to data storage devices and more particularly to systems and methods for accurately determining an average position error (APE) margin in a data storage device.

BACKGROUND OF THE INVENTION

Modern disc drives typically comprise one or more magnetic discs that are coated with a magnetizable medium and mounted on a hub of a spindle motor for rotation at a constant high speed. Information is written to and read from nominally circular, concentric data tracks on the discs through the use of an actuator assembly, which rotates during a seek operation about a bearing shaft assembly positioned adjacent the discs. The actuator assembly typically includes a plurality of actuator arms that extend over the discs, with one or more flexures extending from each of the actuator arms. Mounted at the distal end of each of the flexures is a transducer, including a write element and a read element, for writing information to, and/or reading information from, the tracks of the disc drive, respectively.

To move the transducer over the appropriate track for reading or writing information, the actuator assembly typically includes a voice coil motor (VCM), which includes a coil attached to the actuator assembly, as well as one or more permanent magnets that establish a magnetic field in which the coil is immersed. The controlled application of current to the coil causes magnetic interaction between the permanent magnets and the coil moves in accordance with the well known Lorentz relationship. As the coil moves, the actuator assembly pivots about the bearing shaft assembly, and the heads are caused to move across the surfaces of the discs.

Each of the concentric data tracks on a disc is typically angularly divided into a plurality of data sectors. In addition, special servo information is typically included in each track to assist in determine the position of the read/write head. The servo information is typically written in a plurality of servo wedges that are angularly spaced from one another and interspersed between data sectors around each track of each disk. Each servo wedge typically includes a track identification (ID) field and a group of servo bursts. A servo control system in the disc drive applies an appropriate current to the coil of the voice coil motor to move the transducer toward a desired track during a coarse "seek" mode using the track ID field as a control input. Once the transducer is generally over the desired track, the servo control system uses the servo bursts to keep the transducer over that track in a fine "track follow" mode. The read element of the transducer generally reads the servo bursts to produce a position error signal PES that is indicative of the position of the read element, relative to a predetermined radial position on the track.

To achieve data integrity and high data transfer rates, it is critical that the read and write elements be respectively maintained as close as practicable over the center of each track during read and write operations. For example, even if data are properly written by the write element in a centered relationship over a selected track, attempting to subsequently read the data while the read element is positioned some distance away from the center of the track may result in an unacceptable number of read errors, due to the inability of the read element to properly detect the written data, as well as the potential interference from the selective magnetization of an adjacent track. More significantly, writing data too far away from the track center can prevent subsequent data recovery when the head is centered over the track, and can also corrupt data stored on the adjacent track. The distance a given element is from the center of the track is commonly referred to as the track misregistration (TMR) of the element. As will be appreciated, in order to achieve superior performance from the disc drive, it is necessary to keep TMR to a minimum.

There are number of causes of TMR in a disc drive, principal of which is what is known as runout error. Runout errors come in two primary forms, repeatable runout (RRO) errors and non-repeatable runout (NRRO) errors. RRO errors are synchronous with disc rotation and may be the result of various effects, such as an error in writing the servo burst information on the disc or a disc shift caused by an eccentricity in the disc. NRRO errors are typically not synchronous with disc rotation and may be caused, for example, by bearing defects, noise, spindle motor imperfections, and servo loop response errors. While in general, RRO errors can be removed or compensated for in the disc drive, NRRO errors generally cannot be removed.

In order to produce disc drives having high track densities, and thus high data storage capacities, it is typical during the design and assembly processes of the disc drive to perform a number of tests on the disc drive and its various elements. For example, during the design and assembly processes, actuator assemblies, or parts of actuator assemblies, are tested on a disc drive spin-stand to determine their operational characteristics. Similarly, entire disc drives are also tested, both in the design process and in the manufacturing and certification process, to determine their operation characteristics.

Several of the parameters that are typically measured on the disc drive and its components during the design and/or manufacturing and certification tests include read track misregistration (RTMR) value, write track misregistration (WTMR) value, write-to-write track misregistration (WWTMR), write-to-read track misregistration (WRTMR) value, bit error rate (BER), and average position error (APE) margin. The RTMR value defines the distance the read element is from the predetermined center of the track during a read operation. The WTMR value defines the distance the write element is from the predetermined center of the track during a write operation. The WWTMR defines the wiggling or distance between two written tracks. The total error, that is the distance between where the write element was relative to the center of the track while writing the data and where the read element was relative to the center of the track while reading the data, is the WRTMR. WRTMR is a very important parameter in disc drive design and manufacture, because it represents the sum of most of the things that can cause data-handling problems inside the disk drive. In general, the WTMR and WRTMR describe the servo-mechanical system performance of the disc drive. The BER is the ratio of the number of defective bits on a track to the total number of bits recorded on the track.

The APE margin refers to the margin, as a percentage of track pitch (width), that the read element can be off track while maintaining a given BER, such as, for example, 1E-5 or 1E-6 errors. In general, the APE margin characterizes the performance of various elements or subsystems of the disc drive. In particular, the APE margin is useful in characterizing the disc drive recording subsystem, including the head(s), preamplifier(s), disc(s) and data channel of the disc drive.

As is known, the APE margin is typically measured by writing predetermined data to a track using the write element and reading the written data from the track with the read element while progressively positioning the read element at predetermined distances from the center of the track. The APE margin is then determined for a given BER. That is, the APE margin is the position of the read head from the track center at which a particular BER is measured. Typically, the APE is measured at BER values of 1E-5 and/or 1E-6.

While measuring the APE margin as just described is relatively accurate in measuring APE margins, there is an inherent problem with this type of measurement that relates to the WRTMR. In particular, the APE margin of a given disc drive will be inversely proportional to the WRTMR of the disc drive. The greater the WRTMR of the disc drive, the lower the APE margin. As such, the typical process used to measure the APE margin of a disc drive will not yield an accurate or ideal APE margin. That is, the typical process used to measure the APE margin will not yield an APE margin at zero WRTMR.

As such, there is a need in the art for systems and processes that can more accurately measure APE margins. More particularly, there is a need in the art for systems and processes that can accurately measure APE margins at zero WRTMR.

SUMMARY OF THE INVENTION

Against this backdrop the present invention has been developed. In particular, various embodiments of the present invention described herein relate to systems and methods for accurately determining an ideal average position error (APE) margin in a data storage device. In accordance with one embodiment, a method of determining an ideal average position error margin of a data storage device comprises the steps of first determining a plurality of data pairs, wherein each data pair comprises a write-to-read track misregistration (WRTMR) value and an average position error margin (APE) value. Each of the data pairs is preferably associated with a unique non-repeatable run-out (NRRO) error value of the data storage device. Once the data pairs have been determined, the ideal APE margin of the data storage device may be computed by using the data pairs to extrapolate to an APE margin corresponding to a zero WRTMR.

These and various other features as well as advantages that characterize the present invention will be apparent from a reading of the following detailed description and a review of the associated drawings.

DETAILED DESCRIPTION

Figure 1:
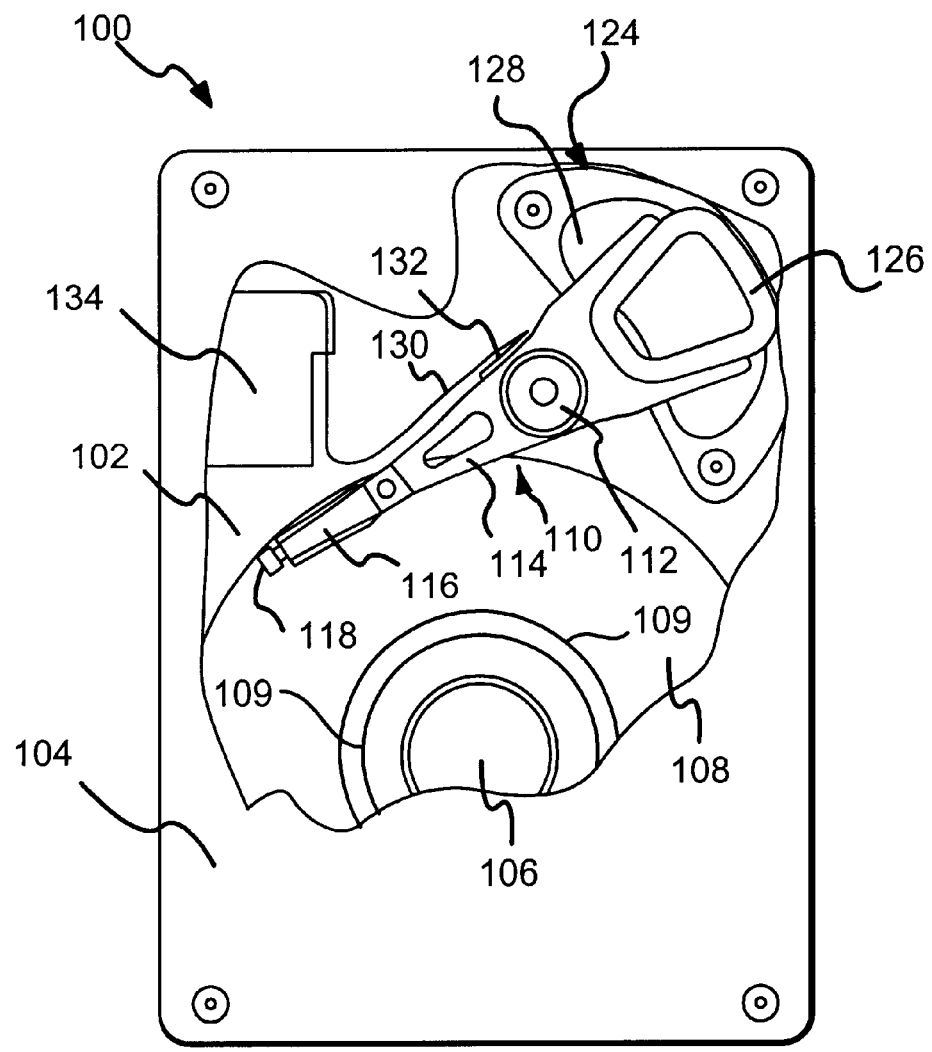
FIG. 1 is a plan view of a disc drive incorporating an embodiment of the present invention and showing the primary internal components of the disc drive.

An exemplary disc drive 100 in which embodiments of the present invention may be incorporated is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more magnetic discs 108 at a constant high speed. Information is written to and read from nominally circular, concentric tracks 109 on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

Each head 118 includes a write element (not shown) and a read element (not shown). In one embodiment, the write element comprises a thin film inductive coil and the read element includes a magneto-resistive (MR) material. In other embodiments, the write and read elements may have other compositions. Although head construction may vary, the effective size of the write element will preferably be larger (with respect to track width) than the size of the read element, and the effective centers of the read and write elements may be physically offset within the head.

As shown in FIG. 1, the disc drive 100 includes a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
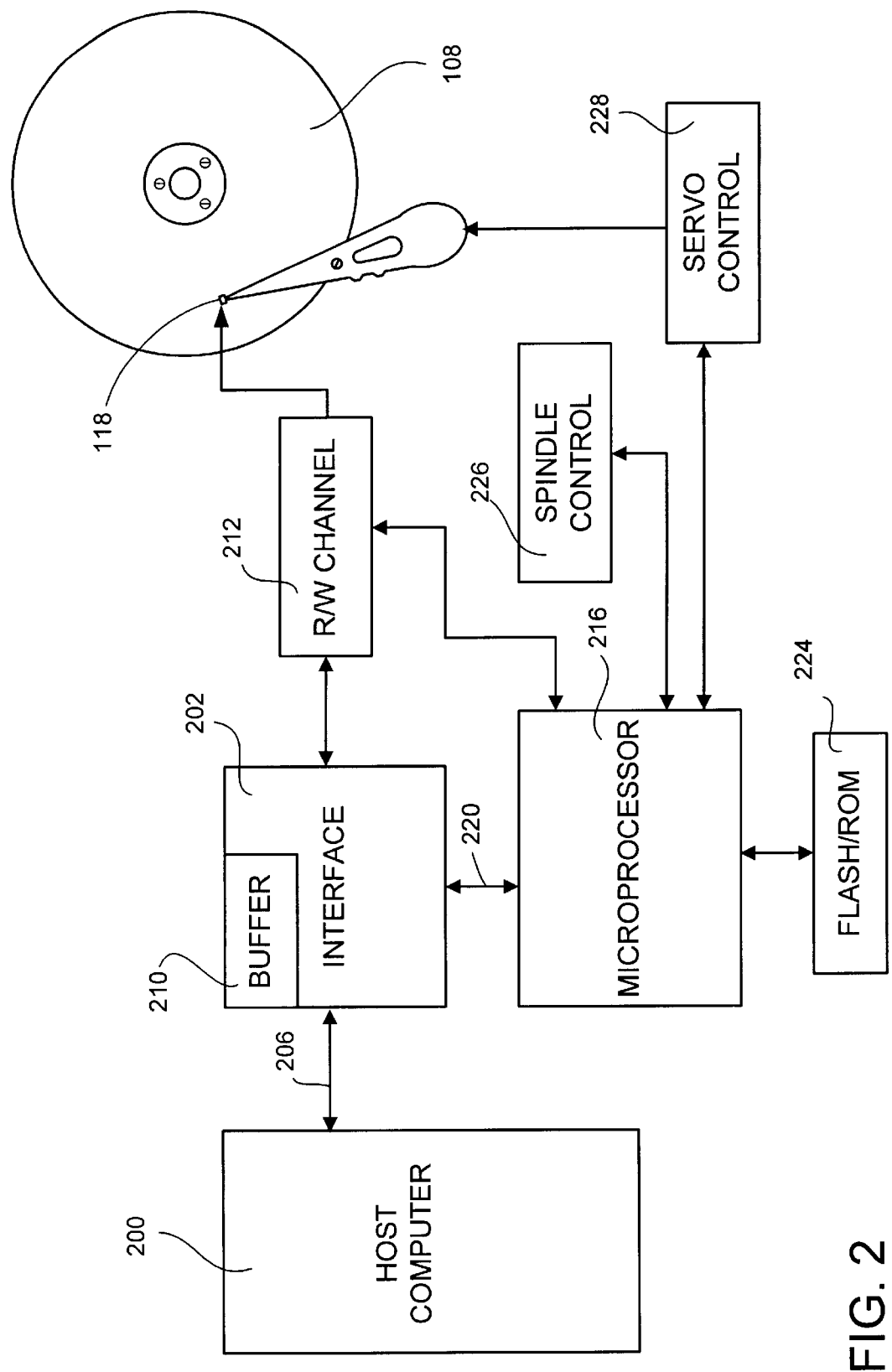
FIG. 2 is a simplified functional block diagram of the disc drive shown in FIG. 1.

Referring now to FIG. 2, shown therein is a generalized functional block diagram of the disc drive 100 of FIG. 1, illustrating some of the functional components of the disc drive 100. Some of these components may be resident on a disc drive PCB (not shown) and may be used to control the operation of the disc drive 100. As shown in FIG. 2, the disc drive includes an interface application specific integrated circuit (interface) 202. The interface 202 may include an associated buffer 210 to facilitate high speed data transfer from a host computer or computers 200 to the disc drive 100. Data to be written to the disc drive 100 are passed via one or more data paths 206 to the interface 202 and then to a read/write channel 212, which encodes and/or serializes the data and provides the requisite write current signals to the write elements of the head 118.

As also shown in FIG. 2, a microprocessor 216 is operably connected by electrical path 220 to the interface 202. The microprocessor 216 provides top level communication and control for the disc drive 100 in conjunction with programming for the microprocessor 216 that may be stored in a non-volatile microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

Each track 109 of the disc drive 100 shown in FIG. 1 preferably includes a number of servo fields that are periodically interspersed with user data fields along the track 109. The user data fields are used to store user data and the servo fields are used to store prerecorded servo information used by a disc drive servo system to control the position of the read/write heads.

Figure 3:
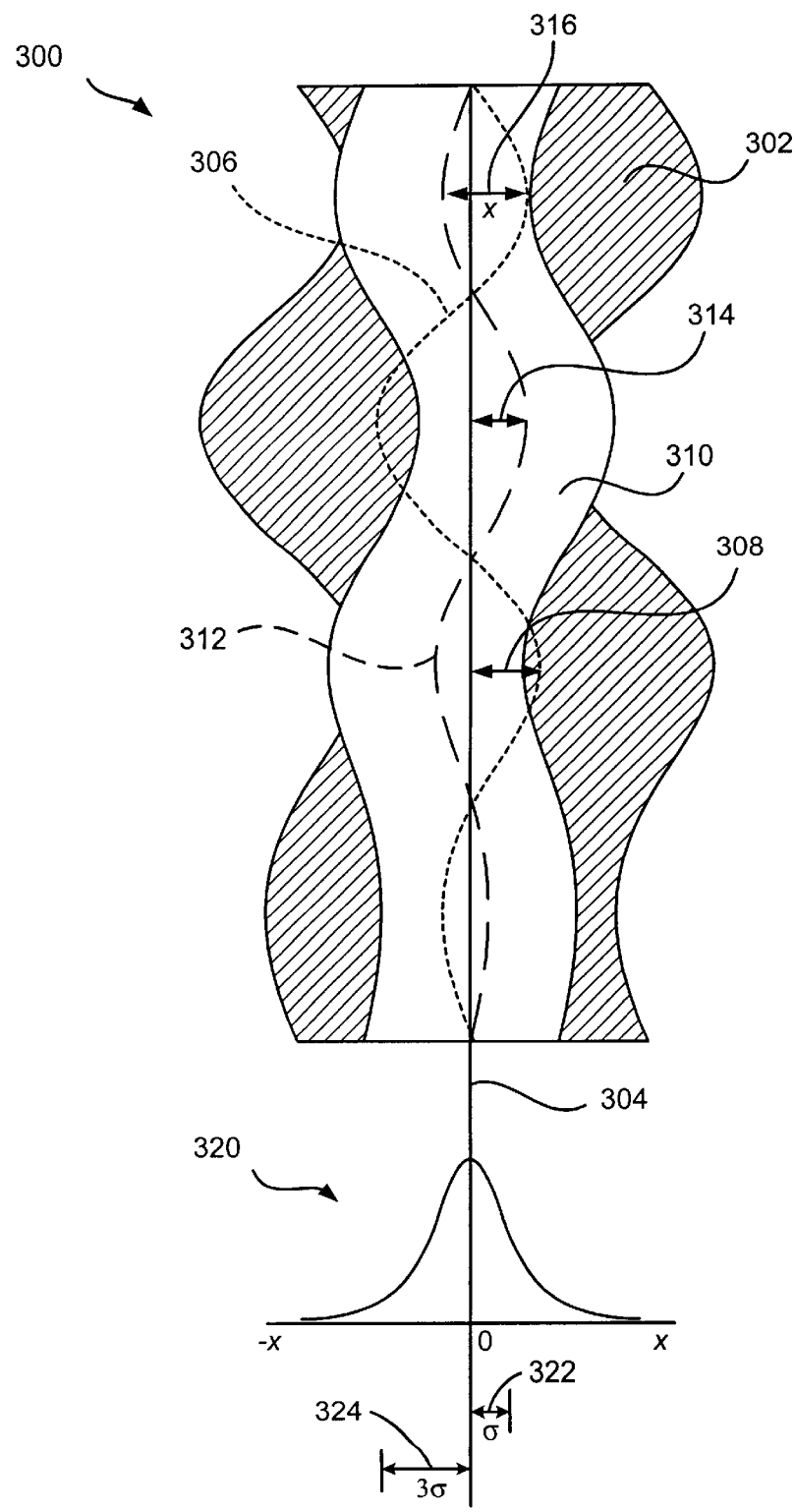
FIG. 3 is a generalized illustration of a track on the disc drive shown in FIG. 1, illustrating various track attributes.

Turning now to FIG. 3, illustrated therein is a generalized representation 300 of a data track 302 written on a disc 108 of the disc drive 100. As will be readily understood by persons skilled in the art, the dimensions and proportions of the track 302 illustrated in FIG. 3 have been exaggerated for clarity. Furthermore, while the data track 302 is shown as following a single, relatively straight line, it should be understood that the data track is typically written as one of a group of nominally concentric circular tracks on a surface of the disc 108 of the disc drive 100.

As shown, the data track 302 is written nominally along an ideal track center line 304, which represents the center of the intended path of travel of the write element while the data track 302 is being written. Typically, the ideal track center line 304 is defined by servo information interspersed throughout the track. However, in some cases, the ideal track center line 304 will be defined by an offset from the track center line. A write track center line 306, and thus the center point of the path traveled by the write element during the writing of the track, is represented as a small-dashed line.

As shown, the written data track 302 does not precisely follow the ideal track center line 304. Stated another way, the write track center line 306 is not coincident with the ideal track center line 304. As is known, the difference 308 between the write track center line 306 and the ideal track center line 304 is commonly referred to as write track misregistration (WTMR). As is also known, there are a number of factors that may contribute to the WTMR including both repeatable runout (RRO) errors and non-repeatable runout (NRRO) errors.

Once the data track 302 has been written to the disc drive 100, the written data track 302 may then be read using the read element. During the reading of the data track 302 the read element will be positioned to follow a read path 310 substantially along the ideal track center line 304. A read path center line 312 of the read path 310, and thus the center point of the path traveled by the read element during the reading of the written data track 302, is represented in FIG. 3 as a large-dashed line.

As with the written data track 302, the read path 310 does not precisely follow the ideal track center line 304. That is, the read path center line 312 is not coincident with the ideal track center line 304. The difference 314 between the read path center line 312 and the ideal track center line 304 is commonly referred to as read track misregistration (RTMR). As with the WTMR, there are a number of factors that may contribute to the RTMR, including both repeatable runout (RRO) errors and non-repeatable runout (NRRO) errors.

It is typical that in addition to not being coincident with the ideal track center line 304, the read path center line 312 is also not coincident with the write track center line 306. The difference 316 between the read path center line 312 and the write track center line 306 is commonly referred to as write-to-read track misregistration (WRTMR). Stated another way, the WRTMR represents the distance between where the data was written on the track by the write element and where the read element is when the data is read.

As will be appreciated, WRTMR varies over time as the track is being written. As such, a statistical distribution 320 can be obtained describing the probability that the center of the read element, and thus the read path center line 312, will be a given distance x (difference 316) from the write track center line 306 at any particular time while track following over the written data track 302. As is typical, the read element, and thus the read path center line 312, will on average be positioned directly over the write track center line 306. That is, the WRTMR is on average zero. As such, the statistical distribution 320 of x has a mean of zero and a standard deviation σ 322. Furthermore, as is typical, the distribution of x follows a normal or Gaussian distribution, where the center of the write element will be within a range from −3σ to 3σ of the write track center line 306 99.7% of the time.

The precise 3σ value 324 for a given written track is typically referred to as the WRTRM value. It should be noted that the term "WRTMR" is commonly used for both a WRTMR at a given time or position on a track, as well as the WRTMR 3σ value. To distinguish between the two common uses of the term, the term "WRTMR value" will be used herein generally to represent a predetermined range of x values, while the term "WRTMR" will be used to represent the WRTMR at a particular time or position on a track. More particularly, in one embodiment, the term "WRTMR value" will be used to represent the WRTMR 3σ value.

The WRTMR value is often measured and used in disc drive design and certification processes, because it is representative of a number of disc drive performance metrics that are indicative of data-handling parameters in the disc drive.

Another disc drive metric that is commonly measured and employed in the design and manufacture of disc drives is average position error (APE) margin. The APE margin represents the ability of the head to move off-track while maintaining a reasonable bit error rate. That is, the APE margin indicates a distance from the center of the track that the read element may move during the reading of data from the track while still maintaining a bit error rate that is lower than a predetermined value. Typically, the APE margin is denoted either in micro-inches or in percentage of track pitch. However, other units of measure could be used, as will be appreciated to those skilled in the art.

In general, the APE margin is measured in a disc drive by writing test data along the center of the track, or some other predetermined location on a track, and reading the written test data back from the track, while progressively moving the read element away from the center of the track. As the read element moves away from the center of the track, the bit error rate of the data being read is determined. As will be appreciated, as the read element moves from the center of the track, the bit error rate will increase. The bit error rate is typically defined as the percentage of bits that have errors relative to the total number of bits received, read, or written. Once the bit error rate reaches a predetermined level, for example 1E-5 or 1E-6, the distance between the read element and the center of the track will be noted. The APE margin is then the distance from the center of the track at which the predetermined bit error rate is encountered.

Typically, the precise bit error rate detected on a given track will be different depending on which side of the center of the track the read element is moved during the test. As such, an average APE margin may be determined to denote the APE margin of the track. Furthermore, rather than determining a specific APE margin for a given track, the APE margin may be determined as an average, or some other statistical measurement, over a set of tracks, such as the tracks in a particular zone, or the tracks of a particular side of a disc, or a the tracks of a particular disc of a disc drive, or of the disc drive overall.

In practice, the APE margin, in combination with average track spacing (ATS) of the disc drive, the write-to-write misregistration (WWTMR), and the WRTMR, dictates the maximum track density that can reasonably be achieved in the disc drive. Measuring the APE margin accurately is important in measuring and qualifying the performance of the head, disc, preamplifier, and/or data channel of the disc drive. Additionally, measuring the APE margin accurately is important in allocating the WWTMR and WRTMR budgets of the disc drive. Unfortunately, the measured APE margin is typical skewed or influenced by the WRTMR. More particularly, as the WRTMR increases, the APE margin decreases. Since each disc drive will likely have at least some WRTMR, previous methods of measuring APE margin have been unable to determine an APE margin that is not related or coupled to the WRTMR of the disc drive. That is, prior methods have been unable to measure or calculate an ideal APE margin. As such, previous methods have been unable to accurately measure and qualify the head, disc, preamplifier and data channel performance of the disc drive.

One embodiment of the present invention relates to a method for determining an ideal APE margin, for a given BER, in a disc drive. In general, the method involves measuring or determining a number of data points in the disc drive, where each data point comprises an APE margin and an associated WRTMR value in the disc drive. Each data point is preferably determined at a different WRTMR value. To achieve different WRTMR values in a single disc drive, the disc drive is subjected to, or caused to have, various levels or magnitudes of NRRO error. As is known, the WRTMR value of a disc drive is proportional to, or affected by, NRRO error in the disc drive.

Changing the NRRO error in the disc drive may be accomplished in a number of ways. In one embodiment, the NRRO error is changed in the disc drive by injecting a predetermined signal, such as, and without limitation, white noise of a predetermined amplitude, into the servo system of the disc drive. In another embodiment, the NRRO error in the disc drive is changed by subjecting the disc drive to various internal or external vibrations. For example, the NRRO error in the disc drive may be changed by externally shaking the disc drive. Those skilled in the art will appreciate that other manners of causing the NRRO error in the disc drive to change may be employed.

Once two or more data points have been determined, an ideal APE margin at a predetermined WRTMR value may be determined, for example, by curve fitting, interpolating or extrapolating the data points, or by other statistical methods. In one embodiment, an ideal APE margin is determined by extrapolating the data points to an APE margin corresponding to the zero WRTMR value. That is, the ideal APE margin in this embodiment would be the APE margin corresponding to the zero WRTMR value. In other embodiments, the ideal APE margin may determined at a predetermined WRTMR value other than the zero WRTMR value.

Figure 4:
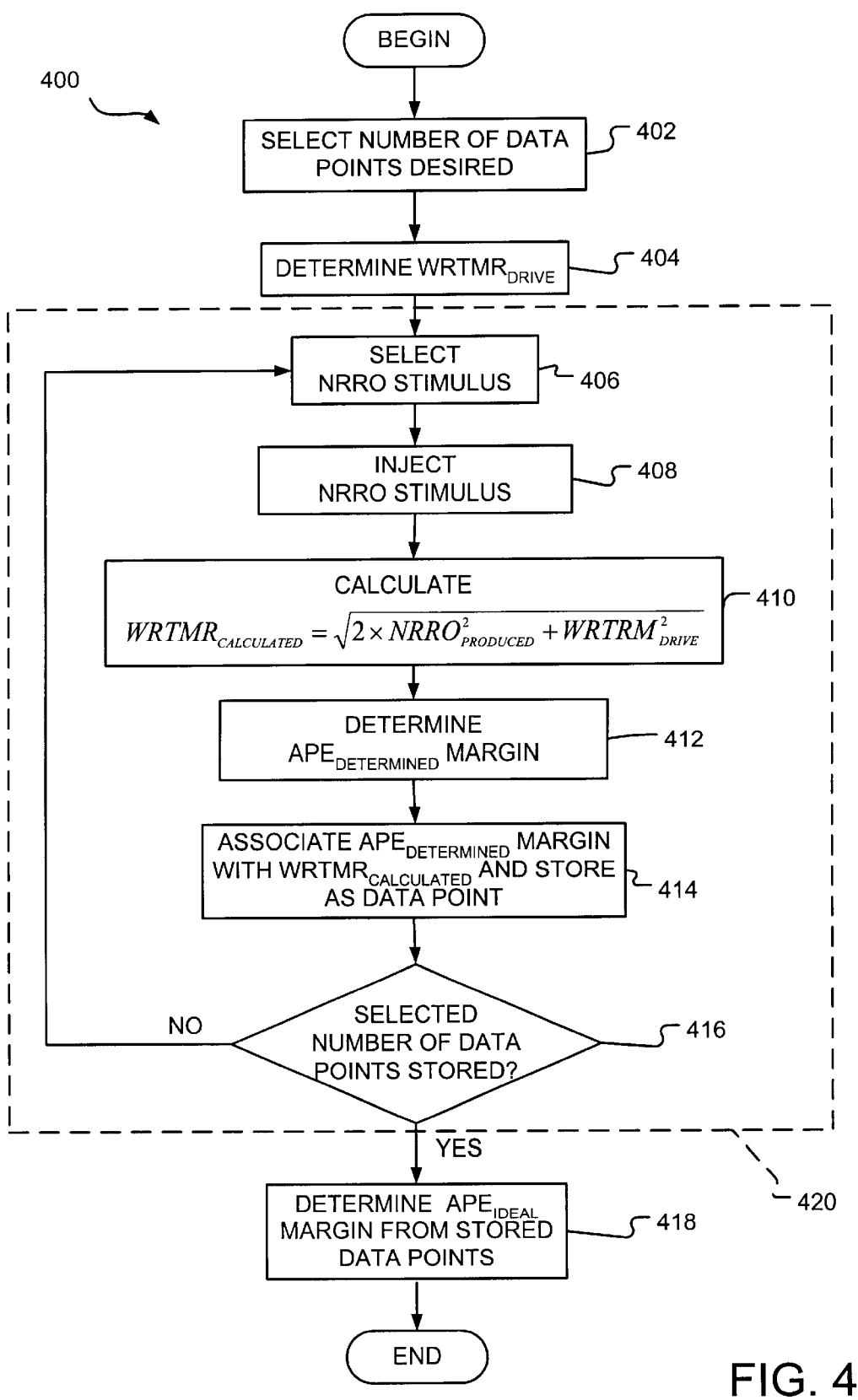
FIG. 4 is an operational flow diagram illustrating operations in accordance with embodiments of the present invention.

Turning now to FIG. 4, illustrated therein is an operational flow 400 illustrating one method of determining an ideal APE margin at a zero WRTMR value, in accordance with an embodiment of the present invention. The operations of the embodiment shown in FIG. 4 may be implemented (1) as a sequence of microprocessor implemented acts or program modules running on one or more microprocessors and/or (2) as interconnected machine logic circuits or circuit modules within a computing device. For example, as will be described, various of the operations shown in FIG. 4 may be performed on a computer workstation connected to a disc drive, while other operations may be performed by hardware, software or firmware in the disc drive. The implementation is a matter of choice dependent on performance requirements. While some of the operations shown are preferably implemented as software stored on a computer readable medium, it will be recognized by one skilled in the art that these operations may be implemented in software, in firmware, in special purpose digital logic, and any combination thereof without deviating from the spirit and scope of the present invention as recited within the claims attached hereto.

A computing device, whether in a workstation connected to a disc drive or in the disc drive itself typically includes at least some form of computer-readable medium. Computer readable medium can be any available medium that can be accessed by a microprocessor. By way of example, and not limitation, computer-readable medium might comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disc storage or other magnetic storage devices, or any other medium that can be used to store the desired information and that can be accessed by a microprocessor.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable medium may also be referred to as computer program product.

The operational flow 400 may take place during a certification or testing process which occurs after the disc drive has been assembled and after servo information has been written to the disc. However this operational flow may take place prior to the complete assembly of the disc drive. Additionally, the operational flow may be performed on, or with respect to, selected components of the disc drive, such as and without limitation, heads, actuator assemblies, or parts of actuator assemblies, that are mounted in a spin-stand. As is known in the art, spin-stands are commonly used to test and verify various components of a disc drive. For example, spin-stands will typically include a rotatable magnetic disc, a transducer having read and write elements, a transducer positioning system, and various hardware and software that is operable to cause data and other signals to be written to and read from the magnetic disc. As such, it should be understood that while the operational flow 400 is described particularly with respect to the disc drive 100, these same operations may be performed on portions of the disc drive 100, or other systems, such as spin-stands, that include components typically found in a disc drive or other data storage devices.

The operational flow 400 exemplifies one method of determining an ideal APE margin at a zero WRTMR value in accordance with an embodiment of the present invention. As shown, during an initial selection operation 402 the number of data points desired is selected. The selection of the number of data points desired may be made in a number of ways. For example, the number of data points desired may be preselected to achieve a particular statistical accuracy. Alternatively, the number of data points may be a number that is determined based on past testing. It is to be understood, however, that the selection operation 402 is not intended to limited to any particular manner or motivation for selecting the data points. All that is required with respect to the selection of the number of data points desired in the selection operation 402, is that at the number of data points selected is at least two, and preferably more than two, so that an ideal APE margin may be calculated with reasonable accuracy.

Following the initial selection operation 402, a determination operation 404 determines the WRTMR of the disc drive 100, denoted in FIG. 4 as $WRTMR_{DRIVE}$. That is, the determination operation 404 determines the WRTMR of the disc drive 100 before an NRRO error stimulus is injected, such as in operation 408. The determination of $WRTMR_{DRIVE}$ in operation 404 may be made in any number of ways known in the art. The determination operation 404 is not limited to any particular method of determining the WRTMR value of a disc drive. Preferably, $WRTMR_{DRIVE}$ will be specified as a percentage of track pitch (% TP), as will $WRTMR_{CALCULATED}$, $NRRO_{PRODUCED}$, $APE_{DETERMINED}$, and $APE_{IDEAL}$, each of which is described below. However, $WRTMR_{DRIVE}$, $WRTMR_{CALCULATED}$, $NRRO_{PRODUCED}$, $APE_{DETERMINED}$, and $APE_{IDEAL}$ may alternatively be specified in other units, provided that the units specified are consistent among each of the measurements.

Next, a select operation 406 selects an NRRO stimulus to be injected. As used herein, the term "NRRO stimulus" defines any type of stimulus, whether electrical, mechanical, or other, that causes an NRRO error in the disc drive 100. Preferably, the NRRO stimulus is selected from a group of NRRO stimulus values, each of which corresponds to a predetermined amount of NRRO ($NRRO_{PRODUCED}$) that will be generated or caused to occur in the disc drive 100 in response to the injection of the NRRO stimulus. The NRRO stimulus values may be preselected to produce selected NRRO errors in the disc drive. For example, in one embodiment the NRRO stimulus values are preselected to produce NRRO errors in the disc drive of 5% TP, 10% TP, 15% TP, 20% TP, and so on. These NRRO stimulus values, and their corresponding $NRRO_{PRODUCED}$ values will preferably be stored in some form of memory, such as in RAM or ROM, that is quickly accessible.

The NRRO stimulus that is to be injected may be any number of disc drive stimuli that produce NRRO in the disc drive. For example, and without limitation, in one embodiment, the injected NRRO will be a predetermined signal, such as white noise, injected into the servo system of the disc drive 100. In such a case, each NRRO selected may correspond to a Digital to Analog Converter (DAC) count value related to the magnitude of noise to be generated and injected into the servo loop. Each DAC count value would then correspond to a particular NRRO error ($NRRO_{PRODUCED}$) in the disc drive.

In another embodiment, the NRRO stimulus may be a mechanic stimulus, such as a shaker that vibrates the disc drive 100 in a predetermined way and at a predetermined value. In such a case, each NRRO stimulus may relate to a different gravitational acceleration (G). Each value of G would then correspond to a particular $NRRO_{PRODUCED}$ in the disc drive.

Following select operation 406, an inject operation 408 injects the selected NRRO stimulus into the disc drive. As will be understood, the manner in which the selected NRRO stimulus is injected into the disc drive 100 is dependent of the type of NRRO stimulus selected. As noted, the present invention is not necessarily limited to any particular type of NRRO stimulus. As such, the present invention is not necessarily limited to any particular manner of injecting NRRO stimulus into the disc drive.

Next, a calculate operation 410 calculates a $WRTMR_{CALCULATED}$ value based on the $WRTMR_{DRIVE}$ value previously determined in determination operation 404 and an $NRRO_{PRODUCED}$ value associated with the NRRO stimulus selected in select operation 406 and injected in operation 408. In one embodiment, $WRTMR_{CALCULATED}$ will be calculated in accordance with the following equation:

$$WRTMR_{CALCULATED} = \sqrt{2 \times NRRO_{PRODUCED}^2 + WRTMR_{DRIVE}^2} \quad (1)$$

In other embodiments, $WRTMR_{CALCULATED}$ may be calculated in accordance with other methods or equations.

Following the calculate operation 410, a determination operation 412 determines the APE margin ($APE_{DETERMINED}$) of the disc drive, where $APE_{DETERMINED}$ is the APE margin of the disc drive 100 when the disc drive is subjected to the NRRO stimulus selected in select operation 406 and injected in inject operation 408. For example, as is typical, $APE_{DETERMINED}$ may be determined by first writing a background random interference (IF) pattern on either side of the center of a track in the disc drive. Random data would then be written to the track. After the data is written, the written data is then read back from the track by a read element, while the read element is progressively moving away from the center of the track. While the read element moved away from the center of the track, a bit error rate (BER) is calculated for the data being read. The process continues in this manner until a BER of a predetermined level is reached. Once the BER of a predetermined level is reached, the distance of the read element from the center of the track, as measured in % TP, is determined and this value is stored as $APE_{DETERMINED}$, for that particular BER. The process may then be repeated to determined an APE margin corresponding to another BER. While a particular manner or method of determining $APE_{DETERMINED}$ has been described, $APE_{DETERMINED}$ may be determined in operation 412 in any number of other ways, as will be appreciated to those skilled in the art.

Next, an associate operation 414 associates $APE_{DETERMINED}$ with $WRTMR_{CALCULATED}$ and stores the result as a data point. As will be appreciated, the association and/or the storage of $APE_{DETERMINED}$ and/or $WRTMR_{CALCULATED}$, may be accomplished in a number of ways. For example, $APE_{DETERMINED}$ and $WRTMR_{CALCULATED}$ may be associated and/or stored wholly in a logical sense. That is, $APE_{DETERMINED}$ and $WRTMR_{CALCULATED}$ may not be physically stored together or near one another in memory. Rather, they could be logically associated with one another. As such, the associate operation 414 is not intended to be limited to a particular manner of storing and/or associating $APE_{DETERMINED}$ and $WRTMR_{CALCULATED}$ as data points. However, the association between a particular $APE_{DETERMINED}$ and a particular $WRTMR_{CALCULATED}$ as a data point will preferably be made with respect to a single injected NRRO stimulus.

Following the associate operation 414, a determination operation 416 determines if the number of data points selected in select operation 402 have been stored. If the selected number of data points have not been stored, the operational flow 400 returns to the select operation 406, and the operation flow repeats operations 406, 408, 410, 412, 414, and 416, as just described, until the number of data points selected in operation 402 have been stored. As will be understood, the operations 406, 408, 410, 412, 414, and 416 form an operational loop 420. Preferably, each time the select operation 406 is performed in the loop 420, a new NRRO stimulus will be selected. In this manner, a number of points will be selected, each of which is associated with, or the result of, a different NRRO stimulus.

If it is determined in the determination operation 416 that the selected number of data points have been stored, an APE determination operation 418 then determines an ideal APE margin ($APE_{IDEAL}$) for the disc drive 100, based on the data points stored previously in the associate operation 414. In one embodiment, the APE determination operation 418 determines $APE_{IDEAL}$ by extrapolating the data points to a value corresponding to a zero $WRTMR_{CALCULATED}$ value. In other embodiments, the ideal APE margin corresponding to the zero $WRTMR_{CALCULATED}$ may be determined by other statistical methods. Finally, in yet other embodiments, $APE_{IDEAL}$ may be determined at values other than the zero WRTMR value.

Following the APE determination operation 418, the operational flow 400 ends. As described, the operational flow 400 provides one method of determining an ideal APE margin for the disc drive. While the operational flow 400 provides one method of determining an ideal value, it is not intended to demonstrate the only method of determining an ideal value in accordance with the present invention. That is, other methods may be used, in accordance with the present invention, that calculate an ideal APE margin. For example, a general embodiment of the present invention may be said to comprise a method for determining an ideal APE margin in a disc drive using a statistical calculation with respect to a number of data points. In accordance with this general embodiment, each of the data points represent a given WRTMR value of the disc drive and a given APE margin of the disc drive, as determined in relationship to a particular NRRO stimulus injected into, or present in, the disc drive. Also in accordance with this general embodiment, any number of systems and/or methods may be used to produce the NRRO stimulus and to determine the data points.

In summary, in view of the foregoing discussion it will be understood that various embodiments of the present invention relate to determining an ideal APE margin in a data storage device. In accordance with one embodiment, a method (such as 400) of determining an ideal average position error margin ($APE_{IDEAL}$) of a data storage device (such as 100) involves first determining (such as 420) a plurality of data pairs. In this embodiment, each data pair comprises a write-to-read track misregistration (WRTMR) value and an average position error margin (APE) value, each data pair being associated with a unique non-repeatable run-out (NRRO) error value of the data storage device. After the plurality of data pairs has been determined, the $APE_{IDEAL}$ is determined (such as 418) based on the plurality of data pairs.

In accordance with this embodiment, each of the data pairs may be determined while subjecting (such as 408) the data storage device to a predetermined NRRO stimulus (such as 406). Also in accordance with this embodiment, the unique predetermined NRRO stimulus may comprise a signal injected into (such as 408) a servo-loop of the data storage device. Alternatively, the predetermined NRRO stimulus may comprise a physical disturbance (such as 408) applied (such as 408) to the data storage device.

Another embodiment of the present invention relates to another method (such as 400) for determining an ideal average position error ($APE_{IDEAL}$) margin of a data storage device (such as 100). In this embodiment, a first write-to-read track misregistration ($WRTMR_{DRIVE}$) value of the data storage device is initially determined (such as 402). Next, the data storage device is subjected (such as 408) to at least two predetermined non-repeatable runout (NRRO) error stimuli (such as 406). A write-to-read track misregistration ($WRTMR_{CALCULATE}$) value associated with each of the at least two predetermined NRRO error stimuli is then calculated (such as 410) and an APE ($APE_{DETERMINED}$) margin associated with each of the at least two predetermined NRRO error stimuli is determined (such as 412). Finally, the $APE_{IDEAL}$ of the data storage device is determined (such as 418) based on the $WRTMR_{CALCULATE}$ values and the $APE_{DETERMINED}$ margins.

In accordance with this embodiment, determining the $APE_{IDEAL}$ may comprise first storing (such as 414) a data point associated with each of the at least two predetermined NRRO error stimuli, where each data point comprising the $WRTMR_{CALCULATE}$ value and the $APE_{DETERMINED}$ margin associated with a unique one of the at least two predetermined NRRO error stimuli. Then, the $APE_{IDEAL}$ of the data storage device may be determined (such as 418) using the stored data points. In such a case, determining the $APE_{IDEAL}$ of the data storage device may comprise using a statistical method to determine the $APE_{IDEAL}$ based on the stored data points. For example, determining the $APE_{IDEAL}$ of the data storage device may comprise extrapolating an APE ideal value corresponding to a WRTMR value of zero using the data points.

Yet another embodiment of the present invention relates to a system for determining ideal average position error (APE) margins. The system preferably comprises a data storage device (such as 100) having a rotatable data storage disc (such as 108), a transducer (such as 118) operable to read data from and write data to the data storage disc, and a positioning system (such as 228) that is operable to position the transducer with respect to the data storage disc. Additionally, the system also will preferably include a program module (such as 400) for determining an ideal APE margin ($APE_{IDEAL}$) in the data storage device.

In accordance with this embodiment, the program module may be operable to determine (such as 420) a plurality of data pairs, wherein each of the data pair comprises a WRTMR value and an APE margin of the data storage device. Additionally, each data pair that is determined by the program module will preferably be associated with a unique NRRO error value of the data storage device. In such a case, the program module will preferably be operable to determine the $APE_{IDEAL}$ of the data storage device based on the plurality of data pairs (such as 418).

It will be clear that the present invention is well adapted to attain the ends and advantages mentioned as well as those inherent therein. While a presently preferred embodiment has been described for purposes of this disclosure, various changes and modifications may be made that are well within the scope of the present invention. For example, while the various embodiments of the present invention are described herein particularly with respect to disc drives, it will be understood to those skilled in the art that the methods and systems described herein are applicable other types of data storage devices. Numerous other changes may be made that will readily suggest themselves to those skilled in the art and that are encompassed in the spirit of the invention disclosed and as defined in the appended claims.

What is claimed is:

1. A method of determining an ideal average position error margin ($APE_{IDEAL}$) of a data storage device, comprising steps of:
    a) determining a plurality of data pairs, each data pair comprising a write-to-read track misregistration (WRTMR) value and an average position error margin (APE) value, each data pair being associated with a unique non-repeatable run-out (NRRO) error value of the data storage device;
    b) determining the $APE_{IDEAL}$ based on the plurality of data pairs.

2. A method as defined in claim 1, wherein at least one of the data pairs is determined while subjecting the data storage device to a predetermined NRRO stimulus.

3. A method as defined in claim 2, wherein the predetermined NRRO stimulus causes a unique NRRO error value associated with one of the data pairs.

4. A method as defined in claim 2, wherein each data pair is determined while subjecting the data storage device to a unique predetermined NRRO stimulus.

5. A method as defined in claim 4, wherein each unique predetermined NRRO stimuli causes a unique NRRO error value associated with a unique one of the data pairs.

6. A method as defined in claim 4, wherein the unique predetermined NRRO stimulus comprises a signal injected into a servo-loop of the data storage device.

7. A method as defined in claim 4, wherein each unique predetermined NRRO stimuli comprises white noise of a predetermined unique amplitude injected into a servo-loop of the data storage device.

8. A method as defined in claim 2, wherein the predetermined NRRO stimulus comprises a physical disturbance applied to the data storage device.

9. A method as defined in claim 1, wherein the data storage device comprises a magnetic disc drive.

10. A computer-readable medium having computer-executable instructions for performing the steps recited in claim 1.

11. A method for determining an ideal average position error ($APE_{IDEAL}$) margin of a data storage device, comprising steps of:
    (a) determining a first write-to-read track misregistration ($WRTMR_{DRIVE}$) value of the data storage device;
    (b) subjecting the data storage device to at least two predetermined non-repeatable runout (NRRO) error stimuli;
    (c) calculating a write-to-read track misregistration ($WRTMR_{CALCULATE}$) value associated with each of the at least two predetermined NRRO error stimuli;
    (d) determining an APE ($APE_{DETERMINED}$) margin associated with each of the at least two predetermined NRRO error stimuli; and
    (e) determining the $APE_{IDEAL}$ of the data storage device based on the $WRTMR_{CALCULATE}$ values and the $APE_{DETERMINED}$ margins.

12. A method as defined in claim 11, wherein the step (e) of determining the $APE_{IDEAL}$ comprises steps of:
    (e)(1) storing a data point associated with each of the at least two predetermined NRRO error stimuli, each data point comprising the $WRTMR_{CALCULATE}$ value and the $APE_{DETERMINED}$ margin associated with a unique one of the at least two predetermined NRRO error stimuli; and
    (e)(2) determining the $APE_{IDEAL}$ of the data storage device using the stored data points.

13. A method as defined in claim 12, wherein the step (e)(2) comprises using a statistical method to determine the $APE_{IDEAL}$ based on the stored data points.

14. A method as defined in claim 12, wherein the step (e)(2) comprises extrapolating an APE ideal value corresponding to a WRTMR value of zero using the stored data points.

15. A method as defined in claim 11 wherein the step (b) of subjecting the data storage device to at least two predetermined NRRO error stimuli comprises injecting the at least two predetermined NRRO error stimuli into a servo control loop of the data storage device.

16. A method as defined in claim 15, wherein each of the at least two NRRO error stimuli comprises white noise of a predetermined amplitude.

17. A method as defined in claim 15, wherein each $WRTMR_{CALCULATE}$ value is calculated according to the following relationship:

$$WRTMR_{CALCULATED} = \sqrt{2 \times NRRO^2_{PRODUCED} + WRTMR^2_{DRIVE}}.$$

18. A method as defined in claim 11, wherein each of the at least two NRRO error stimuli is associated with an $NRRO_{PRODUCED}$ error value produced in the data storage device as a result of subjecting the data storage device to the NRRO error stimuli.

19. A method as defined in claim 11, wherein each of the at least two predetermined NRRO error stimuli comprises a physical vibration of a predetermined magnitude.

20. A method as defined in claim 11, wherein the data storage device comprises a magnetic disc drive.

21. A method as defined in claim 11, wherein the data storage device comprises a spin-stand.

22. A system comprising:
    a data storage device having a rotatable data storage disc including a plurality of tracks, a transducer operable to read data from and write data to the tracks of the data storage disc, and a positioning system operable to position the transducer with respect to the data storage disc; and
    a program module operable to determine an ideal APE margin ($APE_{IDEAL}$) of the data storage device.

23. A system as defined in claim 22, wherein the program module determines a plurality of data pairs, each data pair comprising a write-to-read track misregistration (WRTMR) value and an APE margin of the data storage device, each data pair being associated with a unique non-repeatable run-out (NRRO) error value of the data storage device, and determines the $APE_{IDEAL}$ of the data storage device based on the plurality of data pairs.

24. A system as defined in claim 22, wherein the program module is operable to:
- determine a first write-to-read track misregistration (WRTMR$_{DRIVE}$) value of the data storage device;
- cause the data storage device to be subjected to at least two predetermined non-repeatable runout (NRRO) error stimuli;
- calculate a write-to-read track misregistration (WRTMR$_{CALCULATE}$) value associated with each of the at least two predetermined NRRO error stimuli;
- determine an APE (APE$_{DETERMINED}$) margin associated with each of the at least two predetermined NRRO error stimuli; and
- determine the APE$_{IDEAL}$ of the data storage device based on the WRTMR$_{CALCULATE}$ values and the APE$_{DETERMINED}$ margins.

25. A system as defined in claim 24, wherein each of the at least two NRRO error stimuli comprises white noise of a predetermined amplitude injected into the positioning system of the data storage device.

26. A system as defined in claim 22, wherein the rotatable data storage disc comprises a magnetic disc.

27. A system as defined in claim 22, wherein the data storage device comprises a spin-stand.

* * * * *